(12) United States Patent
Eidesmo et al.

(10) Patent No.: US 7,567,084 B2
(45) Date of Patent: Jul. 28, 2009

(54) METHOD AND APPARATUS FOR DETERMINING THE NATURE OF SUBMARINE RESERVOIRS

(75) Inventors: Terje Eidesmo, Ranheim (NO); Svein Ellingsrud, Trondheim (NO); Anders Farestveit, Nesoya (NO); Hans Magne Pedersen, Trondheim (NO); Sylvia Sandra Pettersen, legal representative, Trondheim (NO); Stale Johansen, Melhus (NO)

(73) Assignee: Electromagnetic Geoservices AS, Trondheim (NO)

( * ) Notice: Subject to any disclaimer, the term of this patent is extended or adjusted under 35 U.S.C. 154(b) by 264 days.

(21) Appl. No.: 10/549,660

(22) PCT Filed: Mar. 17, 2004

(86) PCT No.: PCT/GB2004/001144

§ 371 (c)(1),
(2), (4) Date: May 2, 2006

(87) PCT Pub. No.: WO2004/083898

PCT Pub. Date: Sep. 30, 2004

(65) Prior Publication Data

US 2006/0197532 A1   Sep. 7, 2006

(30) Foreign Application Priority Data

Mar. 17, 2003   (GB)   ................ 0306059.7

(51) Int. Cl.
*G01V 3/12* (2006.01)
*G01V 3/08* (2006.01)
(52) U.S. Cl. ................ 324/334; 324/337; 324/365

(58) Field of Classification Search ......... 324/330–332, 324/334, 337, 344–345, 354, 357, 365; 367/141, 367/178; 181/101, 108–113, 122
See application file for complete search history.

(56) References Cited

U.S. PATENT DOCUMENTS

| 2,077,707 | A | 4/1937 | Melton |
| 2,531,088 | A | 11/1950 | Thompson |
| 2,907,389 | A | 10/1959 | Hitzman |
| 3,052,836 | A | 9/1962 | Postma |
| 3,288,242 | A | 11/1966 | Loeb |
| 3,332,487 | A | 7/1967 | Jones |
| 3,398,356 | A | 8/1968 | Still |

(Continued)

FOREIGN PATENT DOCUMENTS

EP    1 385 971    4/1972

(Continued)

OTHER PUBLICATIONS

Written Opinion, PCT/GB2004/001144, Mar. 17, 2004.

(Continued)

*Primary Examiner*—Bot LeDynh
(74) *Attorney, Agent, or Firm*—Patterson, Thuente, Skaar & Christensen, P.A.

(57) ABSTRACT

A system for investigating subterranean strata. An electromagnetic field and a seismic event are applied from the same location and the responses are detected using respective receivers both located at a second location spaced from the first. The responses are combined to identify the presence and/or nature of subterranean reservoir. The refracted wave components are used.

33 Claims, 1 Drawing Sheet

U.S. PATENT DOCUMENTS

Figure 1:
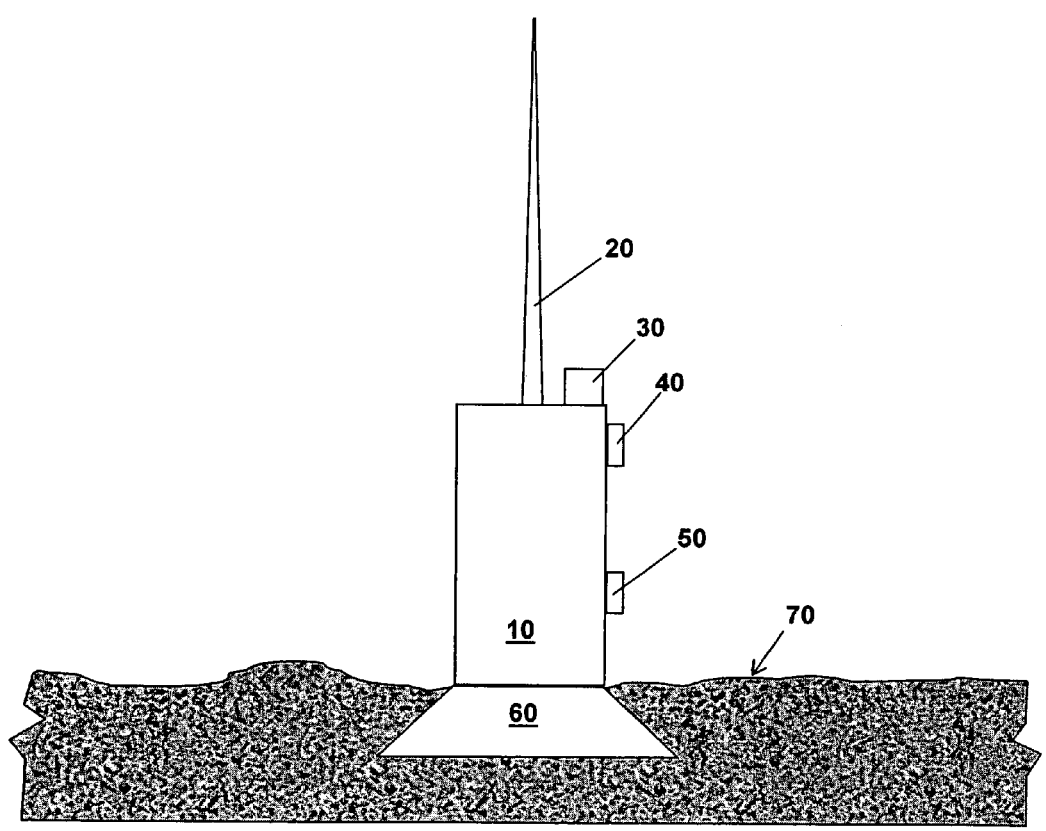

| | | | |
|---|---|---|---|
| 3,548,299 A | 12/1970 | Duroux et al. |
| 3,806,795 A | 4/1974 | Morey |
| 3,836,960 A | 9/1974 | Gehman et al. |
| 3,959,721 A | 5/1976 | Roschuk et al. |
| 3,975,674 A | 8/1976 | McEuen |
| 4,010,413 A | 3/1977 | Daniel |
| 4,047,098 A | 9/1977 | Duroux |
| 4,079,309 A | 3/1978 | Seeley |
| 4,168,484 A | 9/1979 | Wright, Jr. |
| 4,258,321 A | 3/1981 | Neale, Jr. |
| 4,258,322 A | 3/1981 | Rocroi et al. |
| 4,296,379 A | 10/1981 | Yoshizumi |
| 4,308,499 A | 12/1981 | Thierbach et al. |
| 4,417,210 A | 11/1983 | Rocroi et al. |
| 4,446,434 A | 5/1984 | Sternberg et al. |
| 4,451,789 A | 5/1984 | Meador |
| 4,456,067 A | 6/1984 | Pinner |
| 4,489,276 A | 12/1984 | Yu |
| 4,506,225 A | 3/1985 | Loveless et al. |
| 4,547,733 A | 10/1985 | Thoraval |
| 4,583,095 A | 4/1986 | Peterson |
| 4,594,551 A | 6/1986 | Cox et al. |
| 4,616,184 A | 10/1986 | Lee et al. |
| 4,617,518 A | 10/1986 | Srnka |
| 4,633,182 A | 12/1986 | Dzwinel |
| 4,652,829 A | 3/1987 | Safinya |
| 4,660,645 A | 4/1987 | Newlove |
| 4,670,166 A | 6/1987 | McDougall |
| 4,677,438 A | 6/1987 | Michiguchi et al. |
| 4,760,340 A | 7/1988 | Denzau et al. |
| 4,791,998 A | 12/1988 | Hempkins et al. |
| 4,835,474 A | 5/1989 | Parra et al. |
| 4,906,575 A | 3/1990 | Silver |
| 4,957,172 A | 9/1990 | Patton et al. |
| 4,986,354 A | 1/1991 | Cantu |
| 4,992,995 A | 2/1991 | Favret |
| 5,025,218 A | 6/1991 | Ramstedt |
| 5,043,667 A | 8/1991 | Schofield |
| 5,044,435 A | 9/1991 | Sperl |
| 5,066,916 A | 11/1991 | Rau |
| 5,083,611 A | 1/1992 | Clark |
| 5,103,920 A | 4/1992 | Patton |
| 5,177,445 A | 1/1993 | Cross |
| 5,185,578 A | 2/1993 | Stolarczykz |
| 5,192,952 A | 3/1993 | Johler |
| 5,280,284 A | 1/1994 | Johler |
| 5,373,443 A | 12/1994 | Lee et al. |
| 5,400,030 A | 3/1995 | Duren et al. |
| H1490 H | 9/1995 | Thompson et al. |
| 5,486,764 A | 1/1996 | Thompson et al. |
| H1524 H | 4/1996 | Thompson et al. |
| H1561 H | 7/1996 | Thompson et al. |
| 5,563,513 A | 10/1996 | Tasci et al. |
| 5,581,024 A | 12/1996 | Meyer, Jr. et al. |
| 5,689,068 A | 11/1997 | Locatelli et al. |
| 5,704,142 A | 1/1998 | Stump |
| 5,767,679 A | 6/1998 | Schroder |
| 5,777,478 A | 7/1998 | Jackson |
| 5,811,973 A | 9/1998 | Meyer, Jr. |
| 5,825,188 A | 10/1998 | Montgomery et al. |
| 5,841,280 A | 11/1998 | Yu et al. |
| 5,877,995 A | 3/1999 | Thompson et al. |
| 5,886,526 A | 3/1999 | Wu |
| 5,892,361 A | 4/1999 | Meyer, Jr. et al. |
| 5,901,795 A | 5/1999 | Tsao et al. |
| 5,940,777 A | 8/1999 | Keskes |
| 5,955,884 A | 9/1999 | Payton et al. |
| 5,987,388 A | 11/1999 | Crawford et al. |
| 6,002,357 A | 12/1999 | Redfern et al. |
| 6,011,557 A | 1/2000 | Keskes et al. |
| 6,023,168 A | 2/2000 | Minerbo |
| 6,026,913 A | 2/2000 | Mandal et al. |
| 6,049,760 A | 4/2000 | Scott |
| 6,060,884 A | 5/2000 | Meyer, Jr. et al. |
| 6,060,885 A | 5/2000 | Tabarovsky et al. |
| 6,087,833 A | 7/2000 | Jackson |
| 6,101,448 A | 8/2000 | Ikelle et al. |
| 6,114,972 A | 9/2000 | Smith |
| 6,157,195 A | 12/2000 | Vail, III |
| 6,163,155 A | 12/2000 | Bittar |
| 6,181,138 B1 | 1/2001 | Hagiwara et al. |
| 6,184,685 B1 | 2/2001 | Paulk et al. |
| 6,188,221 B1 | 2/2001 | Van de Kop et al. |
| 6,188,222 B1 | 2/2001 | Seydoux et al. |
| 6,225,806 B1 | 5/2001 | Millar et al. |
| 6,236,212 B1 | 5/2001 | Wynn |
| 6,246,240 B1 | 6/2001 | Vail, III |
| 6,294,917 B1 | 9/2001 | Nichols |
| 6,339,333 B1 | 1/2002 | Kuo |
| 6,389,360 B1 | 5/2002 | Alft et al. |
| 6,480,000 B1 | 11/2002 | Kong |
| 6,628,119 B1 | 9/2003 | Eidesmo et al. |
| 6,696,839 B2 | 2/2004 | Ellingsrud et al. |
| 6,717,411 B2 | 4/2004 | Ellingsrud et al. |
| 6,842,006 B2 | 1/2005 | Conti et al. |
| 6,859,038 B2 | 2/2005 | Ellingsrud et al. |
| 6,864,684 B2 | 3/2005 | Ellingsrud et al. |
| 6,900,639 B2 | 5/2005 | Ellingsrud et al. |
| 7,126,338 B2 | 10/2006 | MacGregor et al. |
| 2003/0038634 A1 | 2/2003 | Strack |
| 2003/0043692 A1 | 3/2003 | Ellingsrud et al. |
| 2003/0048105 A1 | 3/2003 | Ellingsrud et al. |
| 2003/0052685 A1 | 3/2003 | Ellingsrud et al. |
| 2004/0027130 A1 | 2/2004 | Ellingsrud et al. |

FOREIGN PATENT DOCUMENTS

| | | |
|---|---|---|
| EP | 0087271 | 8/1983 |
| EP | 0219234 | 4/1987 |
| EP | 0512756 | 11/1991 |
| EP | 0814349 | 12/1997 |
| FR | 2479992 | 10/1981 |
| GB | 2 155 182 | 9/1985 |
| GB | 2 231 602 | 11/1990 |
| GB | 2 256 715 | 12/1992 |
| GB | 2 296 567 | 7/1996 |
| GB | 2 296 576 | 7/1996 |
| GB | 2 301 902 | 12/1996 |
| GB | 2 349 222 A | 10/2000 |
| GB | 2 355 538 | 4/2001 |
| WO | WO 81/01617 | 6/1981 |
| WO | WO 89/10463 | 2/1989 |
| WO | WO 90/00749 | 1/1990 |
| WO | WO 92/13172 | 6/1992 |
| WO | WO 92/15771 | 9/1992 |
| WO | WO 92/15900 | 9/1992 |
| WO | WO 94/20864 | 9/1994 |
| WO | WO 96/06367 | 2/1996 |
| WO | WO 96/18119 | 6/1996 |
| WO | WO 96/33426 | 10/1996 |
| WO | WO 97/33184 | 9/1997 |
| WO | WO98/28638 | 7/1998 |
| WO | WO 99/13966 | 3/1999 |
| WO | WO 00/00850 | 1/2000 |
| WO | WO 00/13037 | 3/2000 |
| WO | WO 00/13046 | 3/2000 |
| WO | WO 00/54075 | 9/2000 |
| WO | WO 00/63718 | 10/2000 |
| WO | WO01/55749 | 8/2001 |
| WO | WO 01/57555 | 8/2001 |
| WO | WO 01/57555 A1 | 8/2001 |
| WO | WO 02/14906 | 2/2002 |
| WO | WO 02/14906 A1 | 2/2002 |
| WO | WO 03/034096 | 4/2003 |

| | | |
|---|---|---|
| WO | WO 03/048812 | 6/2003 |

OTHER PUBLICATIONS

Don White et al., Mineral exploration in the Thompson nickel belt, Manitoba, Canada, using seismic and controlled-source EM methods, Geophysics, vol. 65, No. 6, Nov.-Dec. 2000, pp. 1871-1881.
GB Search Report, GB 0306059.7, date of search Jun. 27, 2003.
PCT Search Report, PCT/GB2004/001144, Mar. 17, 2004.
Yuan et al., "*The Assessment of Marine Gas Hydrates Through Electrical Remote Sounding: Hydrate Without a BSR?*"; 27 Geophys. Res. Letts. 204-217 (Aug. 15, 2000).
MacGregor et al., "*Use of Marine Controlled-Source Electromagnetic Sounding for Sub-Basalt Exploration*", 48 Geophys. Prosp. 1091-1106 (Apr. 2000).
MacGregor et al., "*The RAMESSES Experiment—III. Controlled-Source Electromagnetic Sounding of the Reykjanes Ridge*", 135 Geophys. J. Int. 773-89 (Jul. 1998).
Sinah et al., "*Magmatic Processes at Slow Spreading Ridges: Implications of the RAMESSES Experiment at 57 deg. 45'N on the Mid-Atlantic Ridge,*" 135 Geophys. J. Int. 731-45 (Jul. 1998).
Sinah et al., "*Evidence for Accumulated Melt Beneath the Slow-Spreading Mid-Atlantic Ridge,*" 355 Phil. Trans. R. Soc. Lond. A 233-53 (Jan. 1997).
Constable et al., "Marine Controlled-Source Electromagnetic Sounding 2, The PEGASUS Experiment", Journal of Geophysical Research. 101. B3 (1996): pp. 5519-5530.
Edwards, "On The Resource Evaluation of Marine Gas Hydrate Deposits Using Sea-Floor Transient Electric Dipole-Dipole Methods"; Resource Evaluation of Marine Gas Hydrate Deposits; Jan. 1, 1997.
Strack et al., "Integrating Long-Offset Transient Electromagnetics (LOTEM) with Seismics in an Exploration Environment", Geophysical Prospecting, vol. 44, pp. 997-1017, 1996.
Chave et al., "*Some Comments on Seabed Propagation of ULF/ELF Electromagnetic Fields*", 25 Radio Science 825-36 (Sep. 1990).
MacGregor et al., "*Use of Marine Controlled-Source Electromagnetic Sounding for Sub-Basalt Exploration*", 48 Geophys. Prosp. 1091-1106 (Apr. 2000).
MacGregor et al., "*Marine Controlled Source Electromagnetic Sounding: Development of a Regularized Inversion for 2-Dimensional Resistivity Structures*", 1 LITHOS Science Report 103-109 (Apr. 1999).
MacGregor et al., "*The RAMESSES Experiment—III. Controlled-Source Electromagnetic Sounding of the Reykjanes Ridge*", 135 Geophys. J. Int. 773-89 (Jul. 1998).
Sinah et al., "*Magmatic Processes at Slow Spreading Ridges: Implications of the RAMESSES Experiment at 57 deg. 45'N on the Mid-Atlantic Ridge,*" 135 Geophys. J. Int. 731-45 (Jul. 1998).
Sinah et al., "*Evidence for Accumulated Melt Beneath the Slow-Spreading Mid-Atlantic Ridge,*" 355 Phil. Trans. R. Soc. Lond. A 233-53 (Jan. 1997).
Search Report—PCT/GB99/02823; Dec. 1999.
Greaves et al.; New Dimensions in Geophysics for Reservoir Monitoring: SPE Formation Evaluation:, Paper SPE 20170; pp. 141-150; 1991.
Kaufman et al., "Electromagnetic Field Of An Electric Dipole On The Surface Of A Medium Containing A Thin Resistant Layer," pp. 285-313. Date unknown.
Kaufman et al., "Marine Electromagnetic Prospecting System," 1981 Annual Meeting Abstracts, 1 page.
Greeg et al., "Remote mapping of hydrocarbon extent using marine Active Source EM Sounding," EAGE 65th Conference & Exhibition—Stavanger, Norway, 4 pages, Jun. 2-5, 2003.
Cheesman et al. "On The Theory Of Sea-Floor Conductivity Mappig using Transient Electromagnetic Systems": vol. 52, No. 2; Feb. 1987; pp. 204-217.
Ellingsrud et al., "*How Electromagnetic Sounding Technique Could be Coming to Hydrocarbon E & P*", 20 First Break (Mar. 2002).
Eidesmo et al., "*Sea Bed Logging (SBL), a new method for remote and direct identification of hydrocarbon filled layers in deepwater areas*", 20 First Break (Mar. 2002).

Kaufman et al., "*EM Field of an Electric Dipole on the Surface of a Medium Containing a Thin Resistant Layer*", Frequency and Transient Soundings, publ. Elsevier, (1983).
Kaufman et al., *1981 Annual Meeting Abstract: Marine EM Prospecting System*, 47 Geophysics 431 (1982).
Garg et al., "*Synthetic Electric Sounding Surveys Over Known Oil Fields*", 49 Geophysics 1959-67 (Nov. 1984).
Yuan et al., "*The Assessment of Marine Gas Hydrates Through Electrical Remote Sounding: Hydrate Without a BSR?*"; 27 Geophys. Res. Letts. 204-217 (Aug. 15, 2000).
EM Field of an Electric Dipole On The Surface of a Medium Containing A Thin Resistant Layer; Author unknow, date unknown.
Great Britain Search Report 0119245.9.
"Applications of 3-Dimensional Electromagnetic Induction by Sources in the Ocean", A proposal submitted to MAST III under Area C: Marine Technology, Part 1. Oct. 1996.
"Applications of 3-Dimensional Electromagnetic Induction by Sources in the Ocean", A proposal submitted to MAST III under Area C: Marine Technology, Part 2. Oct. 1996.
Barton et al., "LITHOS", Cambridge Advanced Lithological Imaging Project Phase 1: 1998-2001 Sub-basalt Imaging, Aug. 21, 1997.
Chave et al., "Controlled Electromagnetic Sources for Measuring Electriccal Conductivity Beneath the Oceans 1", Forward Problem and Model Study, J. Geophysical Research, vol. 87, No. B7, pp. 5327-5338, Jul. 10, 1982.
Constable et al., "Marine Controlled-Source Electromagnetic Sounding 2, The PEGASUS Experiment", Journal of Geophysical Research. 101. B3 (1996): pp. 5519-5530.
Edwards, "On The Resource Evaluation of Marine Gas Hydrate Deposits Using Sea-Floor Transient Electric Dipole-Dipole Methods"; Resource Evaluation of Marine Gas Hydrate Deposits; Jan. 1, 1997.
Edwarsd et al., "The Assessment of Marine Gas Hydrates through Electrical Remote Sounding: Hydrate without a BSR", Geophysical Research Letters, vol. 27, No. 16, pp. 2397-2400, Aug. 15, 2000.
Eidesmo et al., "Sea Bed Logging (SBL); A New Method for Remote and Direct Identification of Hydrocarbon Filled Layers In Deepwater Areas", 20 First Break Research Findings, Mar. 1, 2002.
Evans, Constraints on the Large-Scale Porosity and Permeability Structure of Young Oceanic Crust from Velocity and Resistivity Data, Geophysical Journal International, vol. 119, pp. 869-879, 1994.
Evans et al., "On the Electrical Nature of the Axial Melt Zone at 13 degrees North on the East Pacific Rise", Journal of Geophysical Research, vol. 99, No. B1, pp. 577-588, Jan. 1994.
Evans et al, Upper Crustal Resistivity Structure of the East-Pacific Rise Near 13 degrees North, Geophysical Research Letters, vol. 18, No. 10, pp. 1917-1920, Oct. 1991.
Explorations, Scripps Institute of Oceanography, vol. 4, No. 2, 1997.
Flosadottir et al., "Marine Controlled-Source Electromagnetic Sounding 1. Modeling and Experimental Design", Journal of Geophysical Research, vol. 101, No. B3, pp. 5507 to 5517, Mar. 10, 1996.
MacGregor, "Electromagnetic Investigation of the Reykjanes Ridge Near 58° North", PhD Thesis, University of Cambridge. Jan. 1997.
MacGregor et al., "Electrical Resistivity Structure of the Valu Fa Ridge, Lau Basin, from Marine Controlled-Source Electromagnetic Sounding", Geophysical Journal International, 146.1, pp. 217-236, Jul. 2001.
MacGregor et al., "Electromagnetic Evidence for a Crustal Melt Accumulation Beneath the Slow Spreading Reykjanes Ridge", Abstract for 13.sup.th Workshop on EM Induction in the Earth. Date unknown.
MacGregor et al., "Marine Controlled Source Electromagnetism: Effect of Source-Receiver Geometry on the Response of 1-D models", 1996.
Nekut et al., "Petroleum Exploration Using Controlled Source Electromagnetic, Methods", Proceedings of the IEEE, vol. 77(2), pp. 338-362, 1989.
Sinha, "Controlled Source EM Sounding: Survey Design Considerations for Hydrocarbon Applications", LITHOS Science Report, vol. 1, pp. 95 to 101, Apr. 1999.
Sinha et al., "An Active Source Electromagnetic Sounding System for Marine Use", Marine Geophysical Researches, 12:59-68, 1990.

Spies, "Recent Developments in the use of Surface Electrical Methods for Oil and Gas Exploration in the Soviet Union", Geophysics, vol. 48(8), pp. 1102-1112, 1983.

Strack et al., "Integrating Long-Offset Transient Electromagnetics (LOTEM) with Seismics in an Exploration Environment", Geophysical Prospecting, vol. 44, pp. 997-1017, 1996.

Unsworth, "Electromagnetic Exploration of the Oceanic Crust with Controlled-Sources", Chptr 5, Insight into Induction, PhD Thesis, University of Cambridge, 1991.

Unsworth et al., "Electromagnetic Induction by a Finite Elecrtic Dipole Source Over a 2-D Earth", Geophysics, vol. 58, pp. 198-214, 1993.

Yuan et al., "Electromagnetic Assessment of Offshore Methane Hydrate Deposits on the Cascadia Margin, GP22A-08", American Geophysical Union Fall Meeting, San Francisco, 1998.

Yuan et al., "The Assessment of Marine Gas Hydrates Through Electrical Remote Sounding; Hydrate Without A BSR?", Geophys. Res. Letts., vol. 27, No. 16, pp. 2397-2400, Aug. 15, 2000.

Young et al., "Electromagnetic Active Source Near The East-Pacific Rise", Geophysical Research Letters, vol. 8, No. 10, pp. 1043-1046, Oct. 1981.

Ursin, "Review of elastic and electromagnetic wave propagation in horizontally layered media," Geophysics, vol. 48, No. 8, pp. 1063-1081, Aug. 1983.

Osen et al., "Removal of water-layer multiples from multi-component sea-bottom data," Geophysics, vol. 64, No. 3, pp. 838-851, May-Jun. 1999.

_US 7,567,084 B2_

METHOD AND APPARATUS FOR DETERMINING THE NATURE OF SUBMARINE RESERVOIRS

RELATED APPLICATIONS

The present application claims the benefit of PCT Application No. WO 2004/083898, filed Mar. 17, 2004, which claims the benefit of GB 0306059.7, filed Mar. 17, 2003, which are incorporated herein by reference in their entirety.

The present invention relates to a method and apparatus for detecting and determining the nature of submarine and subterranean reservoirs. The invention is particularly suitable for determining whether a reservoir contains hydrocarbons or water, and also for detecting reservoirs with particular characteristics.

Currently, the most widely used techniques for geological surveying, particularly in sub-marine situations, are seismic methods. These seismic techniques are capable of revealing the structure of the subterranean strata with some accuracy. However, whereas a seismic survey can reveal the location and shape of a potential reservoir, it can normally not reveal the nature of the reservoir.

The solution therefore is to drill a borehole into the reservoir. However, the costs involved in drilling an exploration well tend to be in the region of £25 m and since the success rate is generally about 1 in 10, this tends to be a very costly exercise.

It is therefore an object of the invention to provide a system for locating a subterranean reservoir and for determining, its nature with greater certainty, without the need to sink a borehole.

It has been appreciated by the present applicants that while the seismic properties of hydrocarbon filled strata and water-filled strata do not differ significantly, their electromagnetic resistivities do differ. Thus, by using an electromagnetic surveying method, these differences can be exploited and the success rate in predicting the nature of a reservoir can be increased significantly.

Consequently, a method and apparatus embodying these principles form the basis of the present applicant's co-pending British patent application No. 0002422.4.

This contemplates a method of determining the nature of a subterranean reservoir whose approximate geometry and location are known, which comprises: applying a time varying electromagnetic field to the strata containing the reservoir; detecting the electromagnetic wave field response; seeking in the wave field response, a component representing a refracted wave from the hydrocarbon layer; and determining the content of the reservoir, based on the presence or absence of a wave component refracted by the hydrocarbon layer.

It also contemplates a method for searching for a hydrocarbon containing subterranean reservoir which comprises: applying a time varying electromagnetic field to subterranean strata; detecting the electromagnetic wave field response; seeking, in the wave field response, a component representing a refracted wave; and determining the presence and/or nature of any reservoir identified based on the presence or absence of a wave component refracted by hydrocarbon layer.

It further contemplates an apparatus for determining the nature of a subterranean reservoir whose approximate geometry and location are known, or for searching for a hydrocarbon containing subterranean reservoir, the apparatus comprising: means for applying a time varying electromagnetic field to the strata containing the reservoir; means for detecting the electromagnetic wave field response; and means for seeking, in the wave field response, a component representing a refracted wave, thereby enabling the presence and/or nature of a reservoir to be determined.

A refracted wave behaves differently, depending on the nature of the stratum in which it is propagated. In particular, the propagation losses in hydrocarbon stratum are much lower than in a water-bearing stratum while the speed of propagation is much higher. Thus, when an oil-bearing reservoir is present, and an EM field is applied, a strong and rapidly propagated refracted wave can be detected. This may therefore indicate the presence of the reservoir or its nature if its presence is already known.

Electromagnetic surveying techniques in themselves are known. However, they are not widely used in practice. In general, the reservoirs of interest are about 1 km or more below the seabed. In order to carry out electromagnetic surveying as a stand alone technique in these conditions, with any reasonable degree of resolution, short wavelengths are necessary. Unfortunately, such short wavelengths suffer from very high attenuation. Long wavelengths do not provide adequate resolution.

It is an object of the present invention to provide a method and apparatus for reliably locating and identifying submarine reservoirs, in particular, hydrocarbon reservoirs, but at a reduced cost and with reduced operational requirements.

According to one aspect of the invention, there is provided a method of producing a survey report of subterranean strata which comprises: deploying an electromagnetic (EM) field transmitter; deploying a seismic source at substantially the same location as the EM field transmitter; deploying an EM field receiver at a predetermined offset distance from the transmitter; deploying a seismic receiver at substantially the same location as the EM field receiver; applying an EM field to the strata using the EM field transmitter; detecting the EM wave field response using the EM field receiver; applying a seismic event to the strata using the seismic source at substantially the same location as the EM field transmitter; detecting the seismic response using the seismic receiver at substantially the same location as the EM field receiver; analysing the EM wave field response; analysing the seismic response and reconciling the two responses, in order to produce a report on the presence and nature of the strata.

Preferably the method includes extracting and using phase and/or amplitude information from the responses. Preferably, the method includes identifying the refracted wave component of the EM wave field response, identifying the refracted wave component of the seismic response, and using the two refracted wave components to produce the survey report. Preferably, phase and/or amplitude information from the two refracted wave components is used.

According to another aspect of the invention, there is provided a method of producing a survey report of subterranean strata using an EM wave field response from an applied EM field and a seismic response from an applied seismic event, the method comprising: identifying the refracted wave component of the EM wave field response; identifying the refracted wave component of the seismic response; and using the two refracted wave components to produce a report on the presence and nature of the strata.

Again, preferably, phase and/or amplitude information from the two refracted wave components is used. The method preferably includes the steps of: deploying an EM field transmitter; deploying a seismic source; deploying an EM field receiver at a predetermined offset from the EM field transmitter; deploying a seismic receiver at a predetermined offset from the seismic source; applying an EM field to the strata using the EM field transmitter; detecting the EM wave field response using the EM field receiver; applying a seismic event to the strata using the seismic source; and detecting the seismic response using the seismic receiver.

Preferably, the EM field transmitter, the seismic source and the two receivers are all in the same plane. Preferably, the distance between the two receivers is 25 m or less, preferably 5 m or less, and the distance between the EM field transmitter and the seismic source is ≦0.01 times the value of the offset between the EM field transmitter and the EM field receiver. Preferably the EM field transmitter and the seismic source are at substantially the same location, and the EM field receiver and the seismic receiver are at substantially the same location.

Preferably the EM field transmitter comprises an electric dipole antenna, and the EM field receiver comprises an electric dipole antenna.

While longer wavelengths applied by electromagnetic techniques cannot provide sufficient information to provide an accurate indication of the boundaries of the various strata they can be used to determine the nature of a particular identified formation, if the possibilities for the nature of that formation have significantly differing electromagnetic characteristics. The resolution is not particularly important and so longer wavelengths which do not suffer from excessive attenuation can be employed.

Seismic surveying techniques, however can detect the boundaries of subterranean strata with some accuracy, but cannot readily identify the nature of strata located. Thus by using both techniques, the results can be combined and potential hydrocarbon bearing reservoirs can be identified with greater certainty.

Electromagnetic and seismic waves obey similar basic wave equations. Thus the time harmonic wave response of a buried layer in a uniform background (overburden) is obtained from the same basic theory in the two cases. The main difference is that, in the electromagnetic case, there is a complex wave number (propagation constant) giving rise to attenuation and dispersion (i.e. pulse distortion in the time domain).

There are generally three contributions to the resulting signal that corresponds to propagation along different paths between the source and the receiver: the direct signal, the reflected signal, and the refracted signal. The refracted signal is caused by a leaky wave-guide mode that is excited in the layer and, in the limit of an infinitely thick layer, it is transformed into a lateral wave or head-wave that is propagated along the upper interface but inside the layer.

In the electromagnetic case the refracted wave is strongly excited only with the transmitter and receiver dipole antennae in-line. As functions of the offset distance, both the phase delay and exponential damping of this wave will only depend on the properties of the layer, i.e. the layer-thickness and the resistivity contrast relative to the overburden. In this case the direct wave is quite weak and, with a low-resistivity overburden, both the direct wave and the reflected wave are strongly damped for large offsets. With a parallel or broadside dipole antenna arrangement, there is a stronger direct and a much weaker refracted wave, so that contributions are mainly seen from the direct and the reflected waves.

Both the phase and the amplitude of the refracted wave depend on the thickness and relative resistivity of the layer, and these dependencies are expressed by simple mathematical formulae that can be utilized for quantitative measurements. However, the amplitude also has an additional offset dependence caused by the geometrical wave spreading in the layer. Therefore, phase measurements combined with amplitude measurements will yield maximum information about the nature of the layer. Additional information can be obtained by recording at different frequencies and utilizing the known frequency dependence of the phase and amplitude of the refracted wave.

With seismic P waves the situation is generally similar to electromagnetic waves and antennae in the broadside configuration: it is mainly the direct and reflected waves that will contribute. This is generally the case if the layer contains gas or liquid hydrocarbons. However, with a solid layer material, there may be mode conversion at the interfaces (e.g. from P waves to S waves and back) in which case, for example, P waves from the seismic source may excite an S wave leaky wave-guide mode in the layer. This mode may then be refracted back into the overburden as a P wave. This situation is analogous to the excitation of the refracted wave with in-line antennae in the electromagnetic case; the main difference is that now it is the contrast in seismic wave velocities, rather than the resistivity contrast, that determines the phase delay (and associated travel time) of the refracted seismic wave. A more reliable determination of the nature of a subterranean reservoir can therefore be obtained by combining knowledge of its seismic response and its electromagnetic response.

As with electromagnetic waves, large offsets are needed in order to record the refracted seismic waves. The two techniques can therefore be conveniently combined in a common survey in which electromagnetic and seismic recordings are performed simultaneously. If the electromagnetic recording antennae are in contact with the seabed, they can be combined with 4C seismic recording systems that enable recording of both P and S waves.

Preferably, the receiver antenna and the seismic receiver are mounted on the same structure, eg. within 5 to 25 seconds of each other, and the EM field and the seismic event are applied simultaneously. Alternatively, the EM field and the seismic event are applied closely sequentially for example 5 to 25 seconds.

In a preferred system, the EM wave field response and/or the seismic response is analysed to identify the respective refracted wave component. Then, the two refracted wave components are used to determine the presence and nature of the strata. Preferably, the system additionally includes extracting and using phase and/or amplitude information from the responses, more preferably from the refracted wave responses. Preferably, the reflected wave is identified in the seismic response, and the reflected wave component is used to identify subterranean strata.

Additionally, the method may include deploying a magnetic receiver at the same location as the other receivers; detecting a magnetic field response; and using the magnetic field response in combination with the EM wave field response and the seismic response. As with the electric field, the magnetic field response is caused both by the EM transmission and the magnetotelluric signal that is always present as a noise background.

The resistivity of seawater is about 0.3 ohm-m and that of the overburden beneath the seabed would typically be from 0.5 to 4 ohm-m, for example about 2 ohm-m. However, the resistivity of a hydrocarbon reservoir is likely to be about 20-300 ohm-m. Typically, therefore, the resistivity of a hydrocarbon-bearing formation will be 20 to 300 times greater than that of a water-bearing formation. This large difference can be exploited using EM techniques.

The electrical resistivity of a hydrocarbon reservoir normally is far higher than the surrounding material (overburden). EM-waves attenuate more rapidly, and travel slower inside a low resistivity medium, compared to a high resistivity medium. Consequently, hydrocarbon reservoir will attenuate EM-waves less, compared to a lower resistivity overburden. Furthermore, the EM-wave speed will be higher inside the reservoir.

Thus, an electric dipole transmitter antenna on or close to the sea floor induces electromagnetic EM fields and currents in the sea water and in the subsurface strata. In the sea water, the EM-fields are strongly attenuated due to the high conductivity in the saline environment, whereas the subsurface strata with less conductivity causes less attenuation. If the frequency is low enough (in the order of 1 Hz), the EM energy is able to penetrate deep into the subsurface, and deeply buried geological layers having higher electrical resistivity than the overburden (as e.g. a hydrocarbon filled reservoir) will affect the EM-waves. Depending on the angle of incidence and state of polarisation, an EM wave incident upon a high resistive layer may excite a ducted (guided) wave mode in the layer. The ducted mode is propagated laterally along the layer and leaks energy back to the overburden and receivers positioned on the sea floor. In the present application, such a wave mode is referred to as a "refracted wave".

The distance between the EM source and a receiver is referred to as the offset. Due to the fact that a refracted wave in a hydrocarbon-bearing formation will be less attenuated than a direct wave in seawater (or in the overburden), for any given H/C bearing formation, there will be a critical offset at which the refracted wave and the direct wave will have the same signal strength. This may typically be about two to three times greater than the shortest distance from the source or receiver to the H/C bearing formation. Thus, when the offset is greater than the critical offset, the radial EM waves that are refracted into, and guided through the reservoir, will pay a major contribution to the received signal. The received signal will be of greater magnitude and arrive earlier (i.e. have less phase shift) compared to the case where there is no HC reservoir. In many cases, the phase change and/or magnitude change recorded at distances greater than the critical offset may be directly used for calculation of the reservoir resistivity. Furthermore, the reservoir depth may be inferred from the critical offset and/or the slope of a curve representing recorded signal phase shift or recorded signal magnitude as a function of transmitter-receiver offset. The most useful EM source-receiver offset is typically larger than the "critical offset". At offsets larger than the critical offset, a change in the slope of a curve representing recorded signal phase shift or recorded signal magnitude as a function of the source-receiver offset may indicate the reservoir boundary.

The offset can be varied by moving the receivers; or the transmitter and seismic source, or even both. Alternatively, the offset can be kept constant by moving both the receiver and the transmitter and seismic source.

Electromagnetic and seismic waves obey similar basic equations. Thus the time harmonic wave response of a buried layer in a uniform background (overburden) is obtained from the same basic theory in the two cases. The main difference is that, in the electromagnetic case, there is a complex wave number (propagation constant) giving rise to attenuation and dispersion (i.e. pulse distortion in the time domain).

If the offset between the EM transmitter and EM receiver is significantly greater than three times the depth of a reservoir from the seabed (i.e. the thickness of the overburden), it will be appreciated that the attenuation of the refracted wave from the reservoir will often be less than that of the direct wave and the reflected wave. The reason for this is the fact that the path of the refracted wave will be effectively the distance from the transmitter down to the reservoir i.e. the thickness of the overburden, plus the offset along the reservoir, plus the distance from the reservoir up to the receivers i.e. once again the thickness of the overburden.

If no H/C reservoir is present in the area of the EM transmitter and receiver, the detected wave response will consist of a direct wave and possibly a reflected wave. It will therefore be strongly attenuated and its phase will change rapidly with increasing offset.

However, if an H/C reservoir is present, there will be a refracted wave component in the wave response and this may predominate. Due to the higher phase velocity (wavespeed) in H/C filled strata, this will have an effect on the phase of the received wave response.

As a function of offset between source and receiver, the phase of the refracted wave will change almost linearly and much slower than the phases of the direct and reflected waves and, since the latter waves are also much more strongly attenuated with increasing offset, there will be a transition from a rapid phase variation to a slow phase variation with nearly constant slope, indicating the presence of the H/C reservoir. If the edge of the reservoir is crossed, this slow phase variation will change to a rapid phase variation and strong attenuation. Thus, for large offsets, a change from a slow, linear phase variation to a rapid one, or vice versa, will indicate the boundary of an H/C reservoir.

If a constant offset is maintained between transmitter and receiver while varying the position of one or both, the recorded phase shift should be constant as long as the resistivity of the subsurface strata below and between the source and receiver is constant. If a change in phase shift is detected while moving the transmitter and/or receiver at constant offset, this would indicate that one of the instruments is in the vicinity of the boundary of a H/C reservoir.

The polarization of the source transmission will determine how much energy is transmitted into the oil-bearing layer in the direction of the receiver. A dipole antenna is therefore the selected transmitter. In general, it is preferable to adopt a dipole for which the current moment, ie. the product of the current and the effective length, is large. The transmitter dipole may therefore be 100 to 1000 meters in length and may be towed in two different directions, which may be orthogonal. The receiver dipole optimum length is determined by the current moment of the source dipole and the thickness of the overburden.

The technique of the invention can be applicable in exploring land-based subterranean reservoirs but is especially applicable to submarine, in particular sub-sea, subterranean reservoirs. Preferably the EM field is applied using one or more transmitters located on the earth's surface, and the detection is carried out by one or more receivers located on the earth's surface. In a preferred application, the transmitter(s) and/or receivers are located on or close to the seabed or the bed of some other area of water.

The transmitted EM field may be pulsed, however, a coherent continuous wave optionally with stepped frequencies is preferred. It may be transmitted for a significant period of time, during which the transmitter should preferably be stationary (although it could be moving slowly), and the transmission stable. Thus, the field may be transmitted for a period of time from 3 seconds to 60 minutes, preferably from 10 seconds to 5 minutes, for example about 1 minute. The EM receivers may also be arranged to detect a direct and a reflected wave as well as the refracted wave from the reservoir, and the analysis may include distinguishing phase and amplitude data of the refracted wave from corresponding data from the direct wave.

Preferably, the wavelength of the transmission should be in the range $$0.1 \, s \leq \lambda \leq 5 \, s;$$

where λ is the wavelength of the transmission through the overburden and s is the distance from the seabed to the reservoir. More preferably λ is from about 0.5 s to 2 s. The transmission frequency may be from 0.01 Hz to 1 kHz, preferably from 0.1 to 20 Hz, for example 1 Hz.

Preferably, the distance between the transmitter and a receiver should be in the range $$0.5 \, \lambda \leq L \leq 10\lambda;$$

where λ is the wavelength of the transmission through the overburden and L is the distance between the transmitter and the first receiver.

It will be appreciated that the present invention may be used to determine the position, the extent, the nature and the volume of a particular stratum, and may also be used to detect changes in these parameters over a period of time eg. by leaving the receivers (and possibly also the EM field transmitter and the seismic source) in situ.

The electromagnetic signals are sensitive to the electrical resistivity of subterranean layers and, therefore, electromagnetic methods are well suited for the detection of high resistive layers such as H/C reservoirs. However, layers without hydrocarbons may also have high electrical resistivities, eg. layers consisting of salt, basalt, calcite strings, or other dense rocks with low porosities and low water contents. High-resistive layers of this type will generally have higher seismic velocities than the low-resistive overburden, whereas high-resistive H/C reservoirs generally have lower seismic velocities than the low-resistive overburden. Seismic methods can therefore be used to distinguish high resistive H/C reservoirs from other high-resistive layers.

A distinction between H/C reservoirs and other high-resistive layers can be made on the basis of available seismic reflection data for the prospect in question. However, a more reliable distinction will be obtained from seismic refraction data recorded with large offsets between the seismic source and the seismic receiver. This can preferably be carried out in combination with the electromagnetic data collection.

Electromagnetic receiver antennae that are located at the sea bed will preferably be combined with seismic receivers that are also in contact with the sea bed. This means that only one survey will be required to record both the electromagnetic and seismic data, and it will be possible to perform a full four component (three components of the displacement vector in addition to the pressure)—4C-seismic recording of both the P- and S-wave components of the refracted seismic signals.

It will be appreciated that the absence of any refracted wave component in either the EM wave field response or the seismic response will indicate no formations with a differing resistivity or differing acoustic properties present. The presence of a refracted wave component in both the EM field response and the seismic response will indicate the presence of a formation with high resistivity and high acoustic velocity (low porosity) which would suggest eg. basalt or a salt dome. The presence of a refracted EM wave component and the absence of a refracted seismic wave component will indicate high resistivity together with low acoustic velocity and so low porosity, which would suggest an H/C (hydrocarbon) reservoir in perhaps a porous rock formation such as sandstone.

Thus, for large offsets, a high-resistive layer with hydrocarbons is characterised by the presence of a refracted electromagnetic wave without any refracted seismic wave. In contrast, a high-resistive layer that is without hydrocarbons is characterised by the presence of both a refracted electromagnetic wave and a refracted seismic wave. By recording both wave types in the same survey, it is possible to obtain a more reliable identification of H/C reservoirs.

The seismic equipment, including the source and receiver may be conventional both in its design and its use.

The invention enables operators to avoid the effort and expense of a 3D survey by carrying out what amounts to an initial 2D seismic survey and then carrying a method in accordance with the invention in relation to areas of potential interest revealed by the initial survey.

The present invention extends to a receiver assembly comprising: a support structure; an electric dipole receiver antenna mounted on the support structure; a three axis seismic receiver mounted on the support structure; a geophone arrangement mounted on the support structure; a hydrophone mounted on the support structure; and an anchor arranged to attach the support structure to the sea bed.

The invention also extends to a method of investigating subsea strata as described above in relation to producing a survey report, and also to a survey report produced by the methods of the invention.

The invention claimed is:

1. A method of producing a survey report of subterranean strata which comprises:
    deploying an electromagnetic (EM) field transmitter;
    deploying a seismic source at substantially the same location as the EM field transmitter;
    deploying an EM field receiver at a predetermined offset distance from the transmitter;
    deploying a seismic receiver at substantially the same location as the EM field receiver;
    applying an EM field to the strata using the EM field transmitter;
    detecting the EM wave field response using the EM field receiver;
    applying a seismic event to the strata using the seismic source at substantially the same location as the EM field transmitter;
    detecting the seismic response using the seismic receiver at substantially the same location as the EM field receiver;
    analyzing the EM wave field response;
    analyzing the seismic response;
    reconciling the two responses, in order to produce a report on the presence and nature of the strata;
    identifying the refracted wave component of the EM wave field response;
    identifying the refracted wave component of the seismic response; and
    using the two refracted wave components to produce the survey report.

2. A method as claimed in claim 1, which additionally includes extracting and using phase and/or amplitude information from the responses.

3. A method as claimed in claim 1, in which phase and/or amplitude information from the two refracted wave components is used.

4. A method of producing a survey report of subterranean strata using an electromagnetic (EM) wave field response from an applied EM field and a seismic response from an applied seismic event, the method comprising:
    deploying an EM field transmitter;
    deploying a seismic source;
    deploying an EM field receiver at a predetermined offset from the EM field transmitter;

deploying a seismic receiver at a predetermined offset from the seismic source;

applying an EM field to the strata using the EM field transmitter;

detecting the EM wave field response using the EM field receiver;

applying a seismic event to the strata using the seismic source;

detecting the seismic response using the seismic receiver;

identifying a first refracted wave component of the EM wave field response;

identifying a second refracted wave component of the seismic response; and using the first and second refracted wave components to produce a report on a presence and a nature of the strata.

5. A method as claimed in claim 4, in which the EM field transmitter, the seismic source and the two receivers are all in the same plane.

6. A method as claimed in claim 4, in which the distance between the two receivers is 25 meters or less.

7. A method as claimed in claim 4, in which the distance between the EM field transmitter and the seismic source is $\leq 0.01$ times the value of the offset between the EM field transmitter and the EM field receiver.

8. A method as claimed in claim 4, in which the EM field transmitter and the seismic source are at substantially the same location.

9. A method as claimed in claim 4, in which the EM field receiver and the seismic receiver are at substantially the same location.

10. A method as claimed in claim 1, in which the EM field transmitter comprises an electric dipole antenna.

11. A method as claimed in claim 1, in which the EM field receiver comprises an electric dipole antenna.

12. A method as claimed in claim 1, in which the EM field receiver and the seismic receiver are mounted on the same structure.

13. A method as claimed in claim 1, in which the EM field and the seismic event are applied simultaneously.

14. A method as claimed in claim 1, in which the EM field and the seismic event are applied closely sequentially.

15. A method as claimed in claim 1, in which the reflected wave component of the seismic response is identified and the reflected wave component is used to identify subterranean strata.

16. A method as claimed in claim 1, which includes: additionally, deploying a magnetic receiver at substantially the same location as the EM field receiver; detecting a magnetic field response; and using the magnetic field response in combination with the EM wave field response and the seismic response.

17. A method as claimed in claim 1, which comprises repeating the procedure with the EM field transmitter and seismic source, and/or the EM field receiver and seismic receiver, in different locations for a plurality of EM transmissions and seismics events.

18. A method as claimed in claim 1, in which the procedure is repeated at different offsets.

19. A method as claimed in claim 1 which includes the deployment and use of a plurality of EM field receivers and/or a plurality of seismic receivers.

20. A method as claimed in claim 19, in which the EM field receivers and the seismic receivers are mounted on a cable.

21. A method as claimed in claim 1, in which the EM field transmitter and/or the seismic source, and/or EM receiver and/or seismic receiver, are located on or close to the seabed or the bed of some other area of water.

22. A method as claimed in claim 21, in which the seismic source is located at or near the surface of the area of water.

23. A method as claimed in claim 1, in which the frequency of the EM field is continuously varied over the transmission period.

24. A method as claimed in claim 1, in which the EM field is transmitted for a period of time for 3 seconds to 60 minutes.

25. A method as claimed in claim 24, in which the transmission time is from 10 seconds to 5 minutes.

26. A method as claimed in claim 1, in which the wavelength of the transmission is given by the formula:

$$0.1\ s \leq \lambda \leq 10\ s;$$

wherein $\lambda$ is the wavelength of the transmission through the overburden and s is the distance from the seabed to the reservoir.

27. A method as claimed in claim 1, in which the offset between the EM field transmitter and the EM field receiver is given by the formula:

$$0.5\lambda \leq L \leq 10\lambda;$$

where $\lambda$ is the wavelength of the transmission through the overburden and L is the distance between the transmitter and the receiver.

28. A method as claimed in claims 23, in which the transmission frequency is from 0.01 Hz to 1 kHz.

29. A method as claimed in claim 28, in which the transmission frequency is from 0.1 to 20 Hz.

30. A method as claimed in claim 1, in which the seismic receiver records a full flow component seismic recording, comprising three displacement vector components and a pressure component.

31. Apparatus for use in carrying out a method as claimed in claim 1, including a receiver assembly comprising: a support structure; an electric dipole receiver antenna mounted on the support structure; a three axis seismic receiver mounted on the support structure; a geophone arrangement mounted on the support structure; a hydrophone mounted on the support structure; and an anchor arranged to attach the support structure to a sea bed.

32. A method as claimed in claim 6, in which the distance between the two receivers is 5 meters or less.

33. A method as claimed in claim 14, in which the EM field is applied within approximately 5 to 25 seconds of the seismic event.

* * * * *